United States Patent
Rupp (10) Patent No.: US 6,527,212 B2
(45) Date of Patent: Mar. 4, 2003

(54) ICE SHAVER (76) Inventor: Carl A. Rupp, 4576 S. 2200 West, Salt Lake City, UT (US) 84119

( * ) Notice: Subject to any disclaimer, the term of this patent is extended or adjusted under 35 U.S.C. 154(b) by 0 days.

(21) Appl. No.: 09/325,337

(22) Filed: Jun. 3, 1999

(65) Prior Publication Data

US 2002/0053616 A1 May 9, 2002

(51) Int. Cl.[7] ............................................. B02C 19/08
(52) U.S. Cl. .................... 241/293; 241/86.1; 241/88.1; 241/93; 241/DIG. 17
(58) Field of Search ............................ 241/86.1, 88.1, 241/91, 93, 273.3, 293, DIG. 17

(56) References Cited

U.S. PATENT DOCUMENTS

| | | | |
|---|---|---|---|
| 3,552,663 A | 1/1971 | Royals | 241/92 |
| 3,741,486 A | 6/1973 | Kawamata | 241/95 |
| 3,863,462 A | 2/1975 | Treuer | 62/345 |
| 3,921,415 A | 11/1975 | Kattis | 62/354 |
| 4,021,583 A | 5/1977 | Arden | 426/134 |
| 4,048,815 A | 9/1977 | Kattis | 62/354 |
| 4,113,190 A | 9/1978 | Fudman | 241/92 |
| 4,174,742 A | 11/1979 | Murphey | 141/11 |
| 4,238,079 A | * 12/1980 | Otto | 241/248 |
| 4,376,791 A | 3/1983 | Holbrook et al. | 426/565 |
| 4,528,824 A | 7/1985 | Herbert | 62/331 |
| 4,575,012 A | 3/1986 | Uphoff et al. | 241/92 |
| 4,580,905 A | 4/1986 | Schwitters et al. | 366/149 |
| 4,588,136 A | 5/1986 | Homma | 241/95 |
| 4,590,851 A | 5/1986 | Mayer | 99/455 |
| 4,653,928 A | 3/1987 | Bravo | 366/149 |
| 4,655,403 A | 4/1987 | Sciortino | 241/92 |
| 4,681,030 A | 7/1987 | Herbert | 99/484 |
| 4,700,551 A | 10/1987 | Nyrup | 62/346 |
| 4,718,610 A | 1/1988 | Gallaher | 241/37.5 |
| 4,745,773 A | 5/1988 | Ando | 62/320 |
| 4,878,760 A | 11/1989 | Newton et al. | 366/149 |
| 4,919,075 A | 4/1990 | Himi | 118/699 |
| 4,927,087 A | 5/1990 | Palochak | 241/100.5 |
| 4,962,895 A | 10/1990 | Gallaher | 241/101.2 |
| 4,971,824 A | 11/1990 | Jonas | 426/565 |
| 4,998,677 A | 3/1991 | Gallaher | 241/95 |
| 5,007,591 A | 4/1991 | Daniels, Jr. | 241/37.5 |
| 5,050,809 A | 9/1991 | Rupp | 241/86.1 |
| 5,077,075 A | 12/1991 | Wade | 426/564 |
| 5,215,776 A | 6/1993 | Peterson | 426/564 |
| 5,238,696 A | 8/1993 | Fuisz | 426/565 |
| 5,242,125 A | 9/1993 | Rupp | 241/93 |
| 5,246,725 A | 9/1993 | Fisher et al. | 426/565 |
| 5,307,646 A | 5/1994 | Niblock | 62/345 |
| 5,323,691 A | 6/1994 | Reese et al. | 99/275 |
| 5,374,436 A | 12/1994 | White et al. | 426/249 |
| 5,402,949 A | 4/1995 | Berner et al. | 241/101.2 |
| 5,431,027 A | 7/1995 | Carpenter | 62/354 |
| 5,448,894 A | 9/1995 | Niblock et al. | 62/71 |
| 5,582,856 A | 12/1996 | White et al. | 426/249 |
| 5,619,901 A | 4/1997 | Reese et al. | 99/275 |
| 5,632,159 A | 5/1997 | Gall et al. | 62/354 |
| 5,720,175 A | 2/1998 | White et al. | 62/76 |

* cited by examiner

Primary Examiner—William Hong
(74) Attorney, Agent, or Firm—Lloyd W. Sadler (57) ABSTRACT An ice shaver machine that includes a hopper for receiving ice, a blade and scraper for drawing the received ice across the blade, thereby producing thin, snow-like ice shavings or flakes, which are scraped to a spout, which, in turn, is provided for delivering the ice shavings to a container. The spout is shaped so as to be used to create a domed-like snow ball shape on the top surface of the shaved ice in the cup container. Also provided, in one preferred embodiment of this invention, is a flavoring delivery system that permits the user to select a flavoring for addition to the ice shavings, thereby producing a light ice confection. Additionally, this invention provides a flap feature to enhance the placement of the shaved ice into a cup container and off of the user's hands. This invention specifically addresses the need to produce the ice shavings quickly and reliably without undue complexity, in an easy to clean cabinet and mechanism. In one alternative embodiment of this invention, both hand and foot controls are provided to permit easy control of the machine. Also, provided in this invention is a new improved ice blade design, which provides a wide selection of cutting edge shapes to permit the user to select the qualities of resulting ice.

5 Claims, 8 Drawing Sheets

ICE SHAVER

BACKGROUND OF THE INVENTION

1. Field of the Invention

This invention relates to machines for preparing shaved ice confectioneries. More specifically, this invention relates to cubed ice shavers that are particularly adapted to producing a flavored powdered snow like food products.

2. Description of Related Art

A variety of machines have been developed, described and are widely known for creating or processing cold deserts and confectioneries by processing ice. Typically, such devices produce crushed ice for subsequent flavoring. Recently, shaved ice machines have been proposed. Such machines often require the use of large blocks of ice, operate at a relatively slow rate, require significant maintenance, are incompatible with either home use or large volume use, and/or do not provide integrated flavoring application and control.

For general background material, the reader is directed to the following United States patents, each of which is hereby incorporated by reference in its entirety for the material disclosed therein.

U.S. Pat. No. 3,552,663 describes a machine for producing shaved ice for use in making ice confections that comprises an upright housing which includes a thermally insulated chamber for storing ice in chunk form and a motor driven rotor located at the lower part of the chamber that includes blades on the upper face thereof which shave the ice and deliver it through a slot into a chamber from which it is ejected by centrifugal force into a discharge outlet.

U.S. Pat. No. 3,741,486 describes an ice shaving device for home use that has a body member having a wall portion with an opening into which there projects an ice shaver blade mounted in a block, which is adjustably secured to the body member by a screw or the like.

U.S. Pat. No. 3,863,462 describes a flake ice-producing machine having one or more upright round discs rotating on a horizontal shaft.

U.S. Pat. Nos. 3,921,415 and 4,048,815 describe a flake ice making machine having a stationary, vertical freezer cylinder disposed in a water tank having outwardly sloped sides, a rotary member to fracture ice flakes from ice frozen on the cylinder and an upwardly directed discharge chute where ice flakes dry and are discharged by more flakes pushing the flakes up the chute.

U.S. Pat. No. 4,021,583 describes a fruit-flavored quiescently frozen confection that is high in total fruit solids content and which has increased resistance to melting and increased protection against stickiness in storage.

U.S. Pat. No. 4,113,190 describes a device for shaving ice for use in the confections industry, which comprises a series of components in concentric vertical alignment, at the top of which is an insulted hopper for charging the operating mechanism with a supply of chunks or pieces of ice in regular or random form or configuration, and a revolving mechanism for shaving the ice and expelling the snow-like particles of ice through a chute.

U.S. Pat. No. 4,174,742 describes a coin operated vending machine for automatically making and dispensing snow cones.

U.S. Pat. No. 4,376,791 describes frozen dessert products formulated with high levels of fructose and the inclusion of maltodextrin and sweetener additives in prescribed amounts.

U.S. Pat. No. 4,528,824 describes an apparatus for preparing frozen drinks, such as frozen soft drinks and frozen cocktails.

U.S. Pat. No. 4,575,012 describes an ice shaving apparatus that includes a housing having a surface for supporting an ice billet. A cutting head is shown rotatably supported in one end of the housing and functions to discharge ice shaved from the billet through an aperture.

U.S. Pat. No. 4,580,905 describes a flavor mixing and dispensing device for a frozen confection machine and which includes an upright valve cylinder having a discharge outlet at its lower end and a frozen confection inlet port and a plurality of flavoring inlet ports spaced above its lower end.

U.S. Pat. No. 4,588,136 describes a shaving apparatus for shaving food such as ice cubes made by a domestic-use refrigerator, that includes a reservoir or container, a cutter blade, a rotating cylinder, and a mechanism for rotating the cylinder.

U.S. Pat. No. 4,590,851 describes an apparatus for preparing flavored frozen comestibles, the improvement comprising a means for directing a stream of cold air at the surroundings of the equipment in which the product is being prepared, the air being sufficiently cold to reduce the temperature of the surroundings to about 45° F.

U.S. Pat. No. 4,653,928 describes a dual-purpose machine for making ice cream and crushed-ice syrup drinks essentially comprising a cylindrical whipping chamber within which rotates a mixer to one shaft of which are operationally connected motor means, characterized in that said motor means consists of a first and a second motor means which can be selectively operated to control the rotation of said mixer at a relatively high speed for the making of ice cream and at a very low speed for the making of crushed-ice syrup drinks.

U.S. Pat. No. 4,655,403 describes an ice shaving machine that comprises a an inner box and an outer box, a plurality of continuous, and a parallel ice slides.

U.S. Pat. No. 4,681,030 describes an apparatus for preparing frozen drinks, in which an ice-shaving machine is combined with a blender in a single unit, the output of the ice-shaving machine being discharged directly into the blender cup.

U.S. Pat. No. 4,700,551 describes a slice-ice producing machine in which water is frozen on a rotating drum and scraped off therefrom in the axial direction by means of slightly inclined scraper knives or edges provided on a stationary knife bar, the knives are arranged in two groups of mutually opposite inclination.

U.S. Pat. No. 4,718,610 describes a device for shaving ice for making snow cones, which includes an elongated housing, a base for supporting the housing upon a suitable platform, and a pair of castings with one casting being stationarily mounted in the housing and the other being rotatably mounted therein.

U.S. Pat. No. 4,745,773 describes an apparatus for making a soft ice-drink, that comprises an ice mechanism, including a shaver casing, a shaved ice discharge chute, rotatable blades, and a drive motor.

U.S. Pat. No. 4,878,760 describes a mixing and dispensing apparatus for a frozen confection machine for mixing and dispensing a measured volume of frozen confection material and a flavoring material including edible solids.

U.S. Pat. No. 4,919,075 describes an ice slicer with syrup supply mechanism, having a frame mounted on a base, a cutter case accommodating a rotary blade which is mounted to the frame, a slit formed in the cutter case, and a cutting blade so mounted as to be exposed to the slit, a syrup discharge nozzle provided at the front of the frame, a connecting tube connecting the discharge nozzle to a syrup container, and an electromagnetic valve provided in the connecting tube.

U.S. Pat. No. 4,927,087 describes an ice shaving system for domestic purposes that is formed by coupling the shaft on which a rotary blade of a food processor is mounted to the drive shaft of the motor of a garbage disposal unit located under a kitchen sink.

U.S. Pat. Nos. 4,962,895 and 4,998,677 describe an ice shaving machine in which a blade for shaving ice is adjustably supported by a blade mounting and adjustment plate for adjustment of the depth of penetration of the blade into a slot and thus into the ice, and is also adjustable to level the blade across the slot.

U.S. Pat. No. 4,971,824 describes an all natural, frozen food product and method for making the same.

U.S. Pat. No. 5,007,591 describes an ice shaving apparatus that includes an ice receiving chamber having a cylindrical, upstanding sidewall and a substantially flat floor, and elongate opening in the floor, an elongate blade having a knife edge projecting through the opening into the chamber, a removable cover for the chamber, and a means for moving ice placed in the chamber against the knife edge to cut shavings from the ice.

U.S. Pat. No. 5,050,809 describes a flavored shaved cube ice machine that includes a cube ice shaver arranged within a cabinet.

U.S. Pat. No. 5,077,075 describes a fruit juice mix suitable for hard pack product.

U.S. Pat. No. 5,215,776 describes a nonfat aerated dairy dessert.

U.S. Pat. No. 5,238,696 describes a method for preparing a frozen comestible, such as a frozen dessert, that combines a comestible composition with a matrix resulting from melt-spinning an oleaginous substance with a carrier material such as sucrose or maltodextrin.

U.S. Pat. No. 5,242,125 describes a portable snow cone maker that includes a housing with a mounting plate arranged to receive studs that extend at right angles outwardly from a drive shaft end of an electric motor, the studs are fitted through holes in the mounting plate with nuts turned thereover to mount the motor within the housing, which housing mounting plate is open to accommodate the drive shaft fitted therethrough.

U.S. Pat. No. 5,246,725 describes a spoonable low-fat frozen ice product made spoonable at temperatures in excess of 4° F., and method for making the same.

U.S. Pat. No. 5,307,646 describes a flake ice machine that includes a rotatable cooling member defining cooling surfaces and a plurality of internal refrigerant flow passages.

U.S. Pat. Nos. 5,374,436, 5,582,856 and 5,720,175 describe a system and method for making a frozen confection having a plurality of differently flavored or colored sections.

U.S. Pat. Nos. 5,322,691 and 5,619,901 describe a beverage-dispensing machine that provides portion control of the respective drink mixes being dispensed, and the precise amount is adjustable within certain limits.

U.S. Pat. No. 5,402,949 describes an ice shaving apparatus that comprises an oval shaped base with an oval shaped ice block shaving table mounted directly above the base by way of four tubular legs, an oval shaped upper plate mounted directly above the ice block shaving table by way of four additional tubular legs collinear with the lower four legs, threaded rods extending through the tubular legs, a motor, a gearbox, and a rack and pinion mechanism mounted on the upper plate coupled to a vertically movable shaft and an ice pick disk extending downward towards the ice block shaving table to engage and rotate the block of ice on the shaving table.

U.S. Pat. No. 5,431,027 describes a flake ice-making apparatus that includes a cylindrical refrigerant evaporator having a cylindrical evaporator chamber surrounding a cylindrical ice-forming bore surface.

U.S. Pat. No. 5,448,894 describes a disk flake ice machine that includes a cooling members mounted for rotation about an axis and defining a first and second annular cooling surfaces and a peripheral edge in which is formed an annular groove.

U.S. Pat. No. 5,632,159 describes a cooling disk for an evaporative refrigerant cooled flake ice machine, that includes an axial aperture, a circumferential outer perimeter, and first and second side cooling surfaces.

SUMMARY OF THE INVENTION

It is desirable to provide a cubed ice shaver that receives cubes of ice and shaves the ice into a powdery snow-like texture and is adapted to dispense flavoring on the shaved ice, thereby providing a confectionery product for human consumption.

Therefore, it is the general object of this invention to provide a machine for shaving cubed ice, dispensing the shaved ice into a receiver, and selectively dispensing one or more flavorings on the received shaved ice.

It is a further object of this invention to provide a machine for shaving ice into a snow-like texture.

Another object of this invention is to provide a machine for shaving ice and which provides a flavoring dispensing mechanism that permits the convenient selection of flavors.

A further object of this invention is to provide a machine for shaving ice into a confectionery and which is adapted to provide high volume shaved ice production.

It is a still further object of this invention to provide a machine for shaving ice, which is specifically adapted for home use.

Still another object of this invention is to provide a machine for shaving ice that adapted for convenience store use.

It is a further object of this invention to provide a machine for shaving ice that provides enhanced shaving speed control.

Another object of this invention is to provide a machine for shaving ice that has an improved blade design.

A further object of this invention is to provide a machine for shaving ice that has improved "snow" dispensing.

These and other objects of this invention are intended to be covered by this disclosure and are readily apparent to those of ordinary skill in the art upon review of the following drawings, detailed description, claims and abstract of this disclosure.

Reference is now made to the preferred and alternative embodiments of this invention as described below.

DETAILED DESCRIPTION OF THE INVENTION

This invention is an Ice Shaving machine for receiving cubed ice and thinly slicing such cubed ice to produce a powdery snow-like textured confection. It should noted that for the purposes of this patent disclosure, ice cubes are defined to be relatively small pieces of ice, such as are commonly used to cool beverages and not to be ice having any particular geometric shape. The ice cubes are received in a hopper, which permits the cubes to come into contact with a blade. The blade shaves off paper-thin slices of ice. A scrapper collects the paper-thin slices of ice and moves it to a spout, under which a container is placed to receive the slices of ice. Once the container is sufficiently full flavorings may be added, either through an integrated flavor dispensing system or from stand-along flavor containers. This invention has two primary embodiments and several alternative blade designs, which are described in detail in the following discussion.

Figure 1:
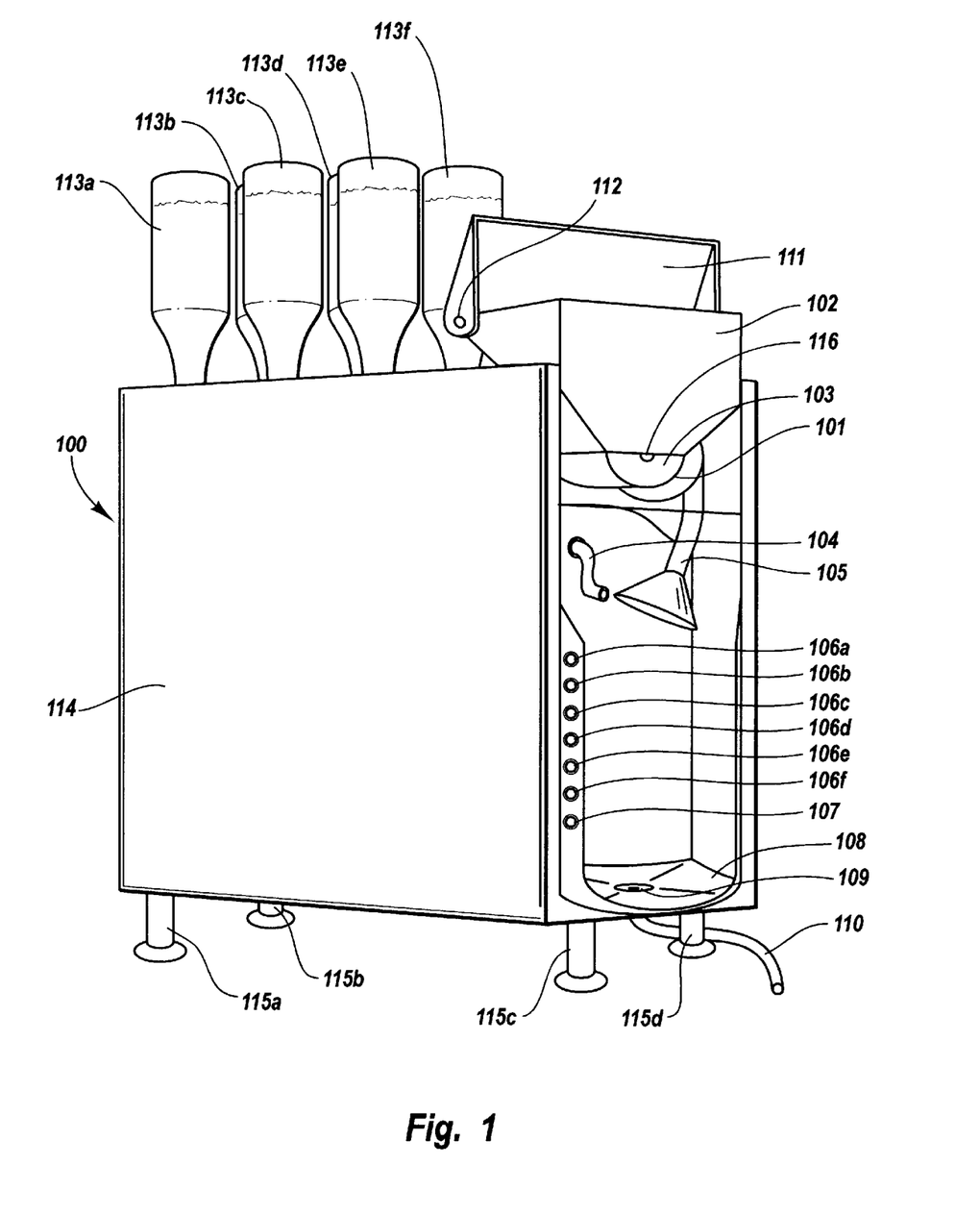
FIG. 1 depicts a perspective view of the preferred ice shaving machine of this invention.

FIG. 1 shows a perspective view of the preferred ice shaving machine 100 of this invention. The machine 100 is shown having a cabinet 114, which preferably is made of stainless steel, although alternatively a light-weight fiberglass material may be substituted without departing from the concept of this invention, for durability and ease of cleaning. Attached to the top of the cabinet 114, is a hopper 102 for receiving cubed ice. The preferred hopper 102 is composed of a generally clear "lexan" plastic material. Mounted to the hopper 102 is a lid 111, pivotally fastened to the hopper 102. In the preferred embodiment, a switch 112 is provided in the lid 111 —hopper 102 connection to shut off the operation of the machine 100 when the lid 111 is raised. An ice scraper 103, mounted to a shaft 116, which turns the scraper 103 bringing the ice into contact with the blade 101. The preferred scraper 103 has two or more paddles, which both pick up the ice cubes and push them across the blade 101 and collect the shavings. The scraper 103 continuously moves the ice across the blade 101, freeing flakes or shavings of ice, which are received by the spout 105. The preferred blade 101, is slotted with many slots (shown in FIG. 4. Each slot has an edge slightly bent upwards toward the direction of the received ice cubes. This preferred blade 101 is preferably made of high quality stainless steel to maximize the blade life. The blade 101 is fixed in place in a circular slot to provide consistent ice shaving. The ice flakes fall through the spout 105 where they are received in a container (not shown). Once a sufficient quantity of ice flakes is collected in the container, flavoring may be added. A flavor dispenser 104 is provided. In this embodiment of the invention 100, six flavor selection switches 106a–f are provided on the front of the cabinet 114. The flavors are provided by six inverted bottles 113a–f, which are fitted to receptacles on the top of the cabinet 114. An automated water switch 107 is also provided to flush or clean the flavoring from the dispenser system. The water can also be used to dilute the concentrated flavoring. A drain pan 108 is provided with a drain 109, which has a drain hose 110 for handling spills. This embodiment 100 of the invention is adapted specifically to rest on a counter top and has four legs 115a–d. Preferably, the machine is ten inches wide, twenty inches tall and fifteen inches deep. Alternative sizes are contemplated by the inventor and should be considered as within the scope of this invention.

Figure 2:
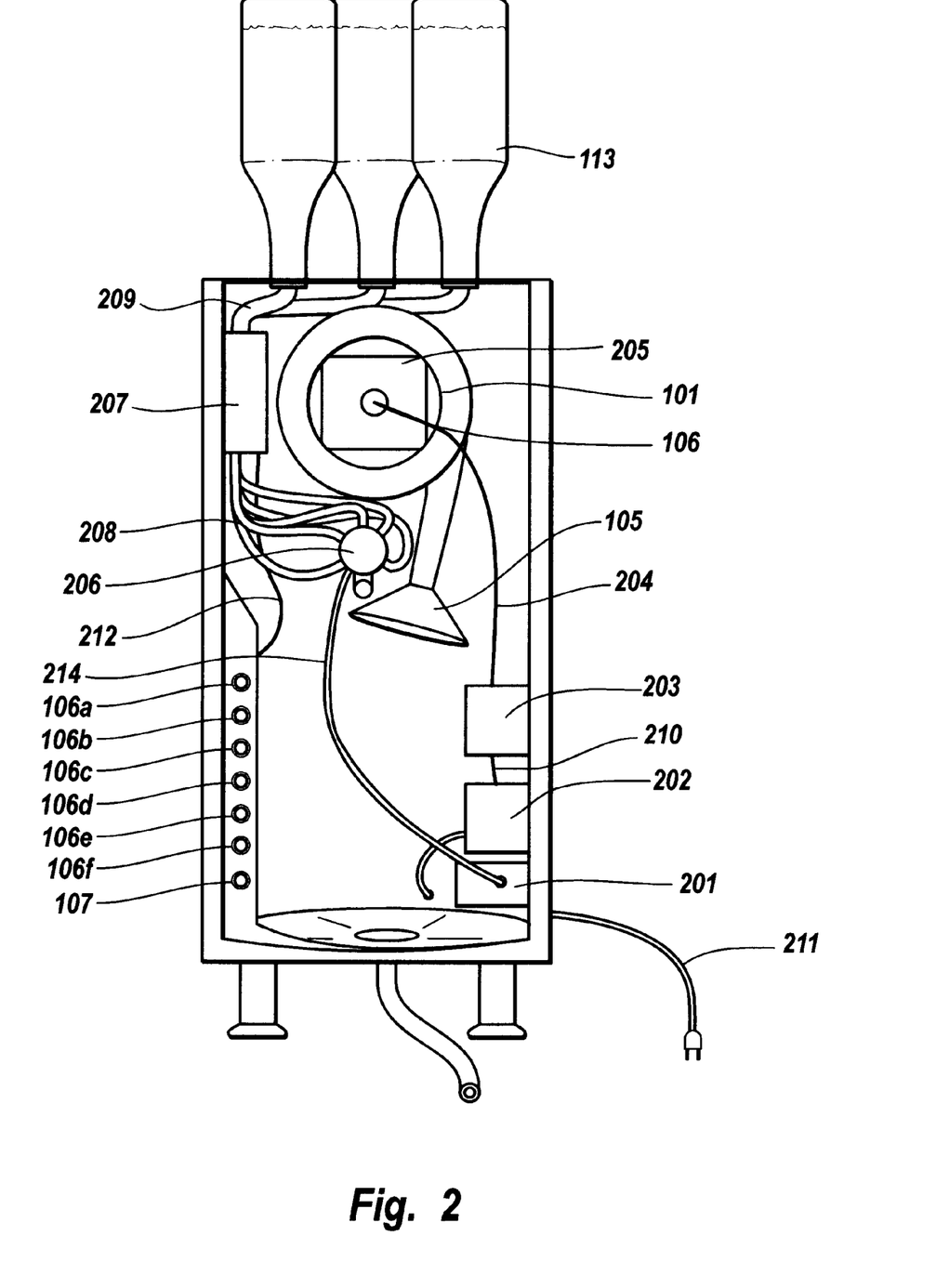
FIG. 2 depicts a front view of the preferred ice shaving machine of this invention with the cabinet removed to view the preferred internal components.

FIG. 2 shows the front view of the preferred ice shaving machine 100 of this invention, with the cabinet removed to show the preferred internal components and connections. This view shows the switches 106a–f, 107 electrically connected by a wire bundle 212 to a flavoring valve assembly 207. The preferred flavoring valve assembly 207 receives six hoses 209, each of which is fitted to the flavoring bottle receptacle. Also connected to, and providing the output for the flavoring valve assembly 207 are six output hoses 208, each of which is connected to the flavoring manifold 206, which provides the output of flavoring and water to the flavor dispenser 104. A water valve 201 is provided connected by a fluid tube 214 to the flavoring manifold 206 for mixing the water with the flavors, to the manifold 206. Note that typically and preferably the flavors are gravity fed to the manifold 206. A voltage regulator/transformer 202 receives AC power via a standard three-prong power cord 211 and produces DC electric power for the motor 205 and the flavoring valve assembly 207. Between the voltage regulator/transformer 202 and the motor 205 is a speed controller 203, which includes a motor speed selection dial (not shown). The voltage regulator/transformer 202 is connected via an electric conductor 210 to the speed controller 203, which in turn, is connected to the motor 205 via a second electric conductor 204. The preferred motor is a DC motor capable of turning the shaft at between 400 and 500 rpm. Alternatively, it is contemplated that an AC motor capable of 1100 rpm may be substituted. Other motor configurations can be substituted without departing from the concept of this invention.

Figure 3:
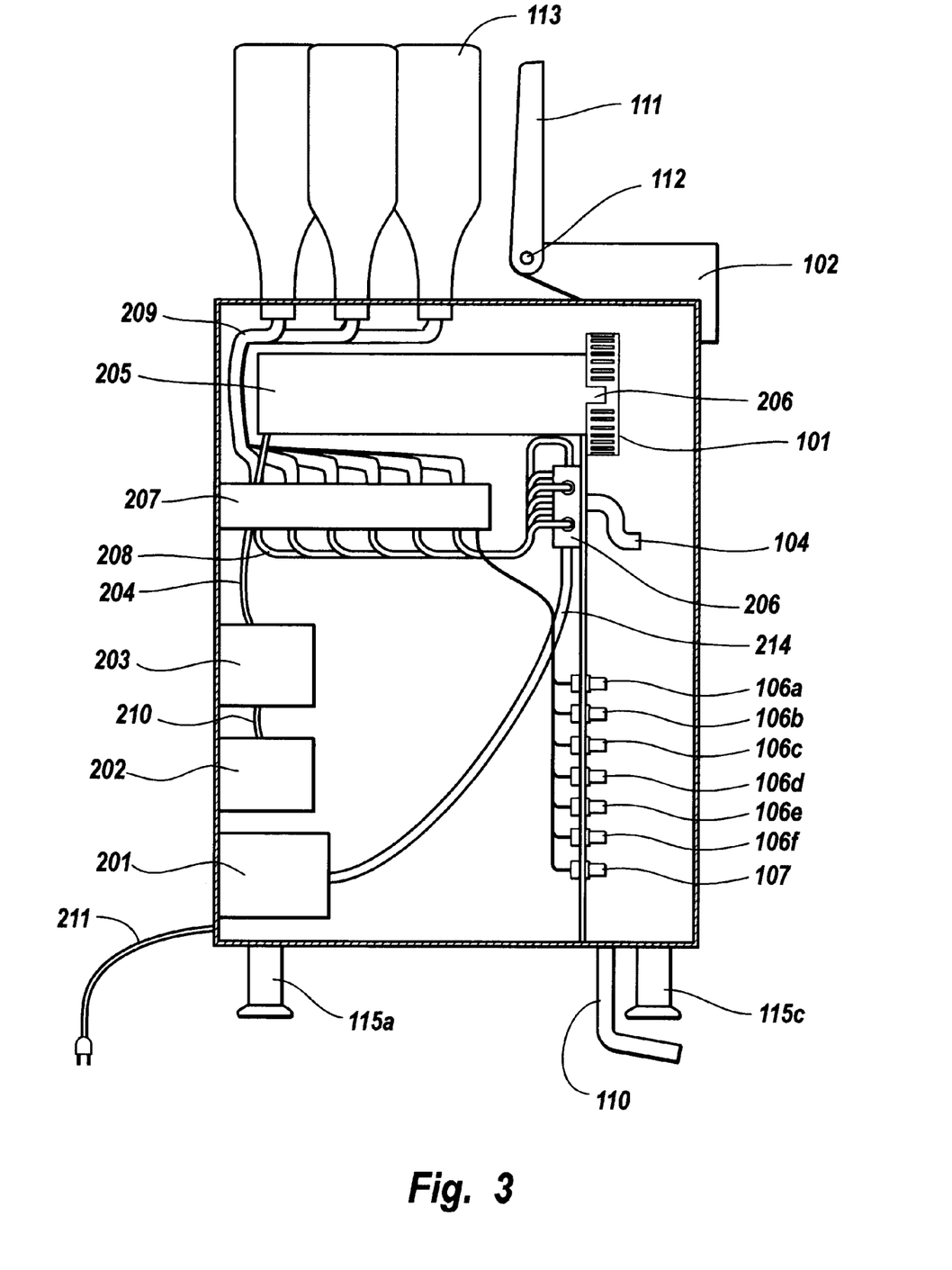
FIG. 3 depicts a side view of the preferred ice shaving machine of this invention with the cabinet removed to view the preferred internal components.

FIG. 3 shows the side view of the preferred ice shaving machine 100 of this invention, with the cabinet removed to show the preferred internal components and connections. This view provides additional detail of the internal components of the invention, each in the preferred and desired location and orientation. The reader is particularly directed to the side view of the blade 101, showing the slots as previously described.

Figure 4:
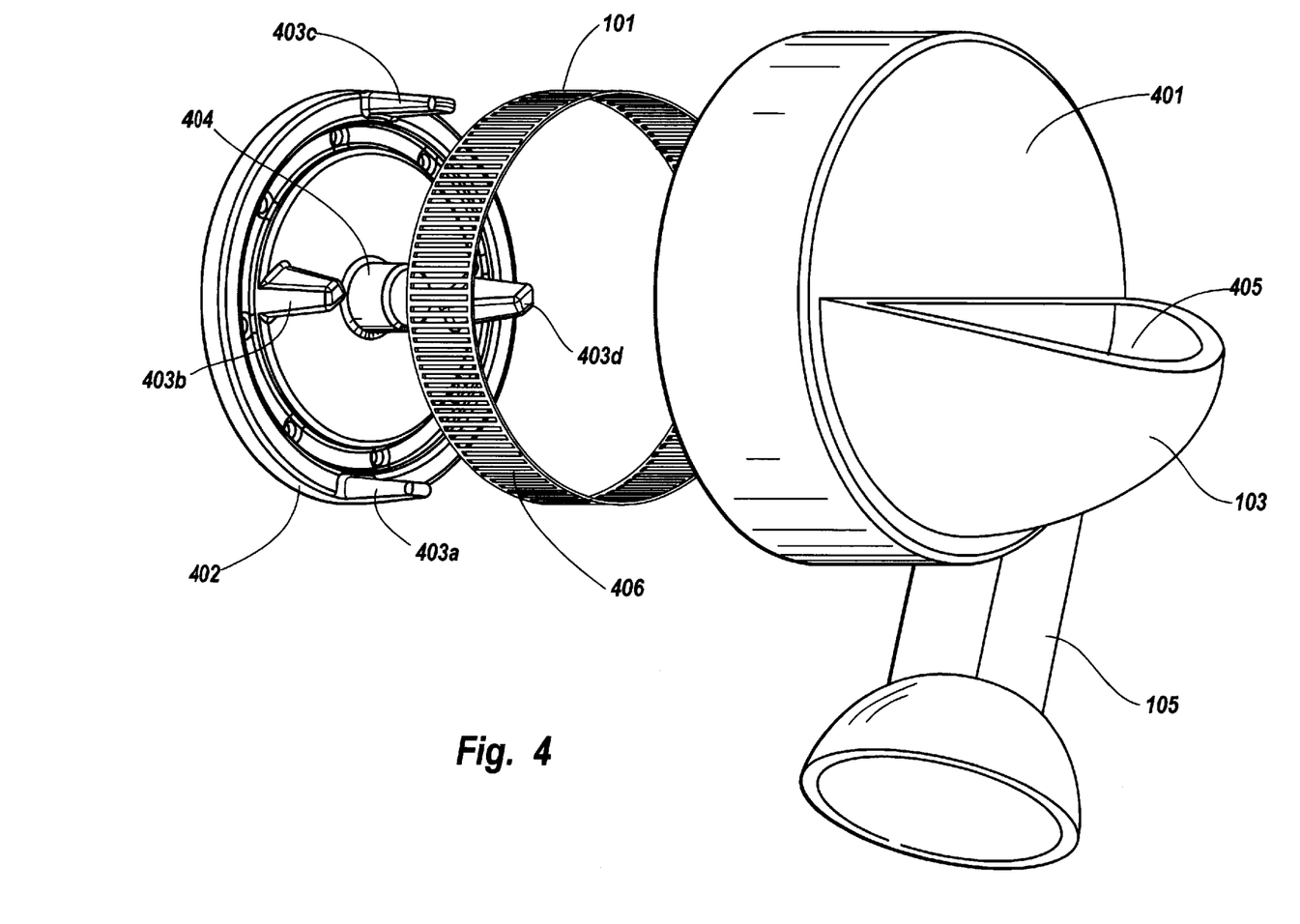
FIG. 4 depicts a detailed view of the preferred blade, scraper and spout assembly.

FIG. 4 shows a detailed view of the preferred blade 101, scraper 402, and spout 105 assembly of this invention. The spout 105 includes an outer shell 401, which fits over and around the blade 101 as well as the scraper 402, which itself fits within the blade 101, and an opening 405. Ice is received through the opening 405 and is drawn within the blade 406, where it is spun in contact with the blade 406 by the scraper 402. The scraper 402 has paddles 403a–c and a shaft head 404 for receiving the drive shaft 206 of the motor 205. The blade 101 is shown with the slots 406 as previously described.

Figure 5:
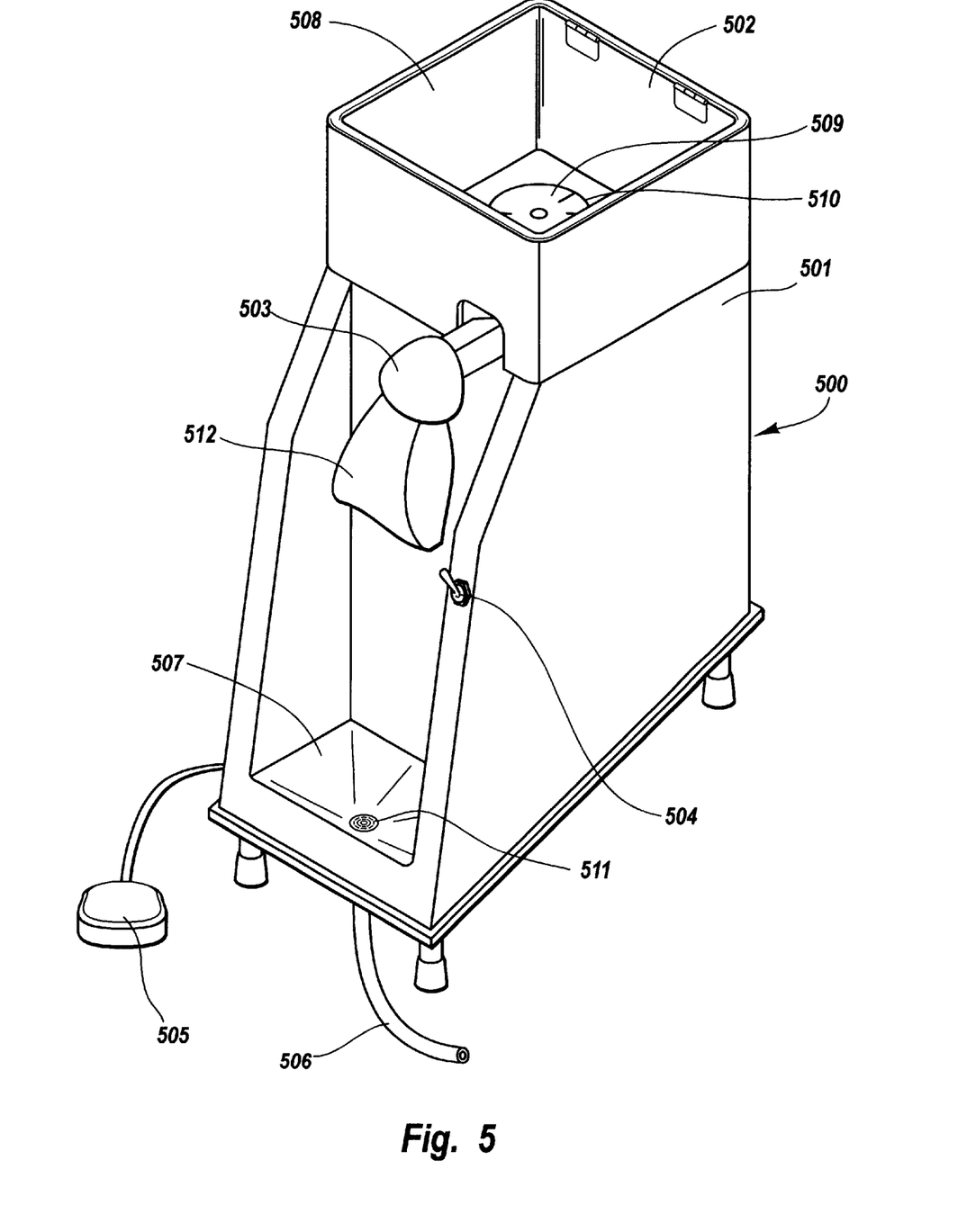
FIG. 5 depicts a perspective view of an alternative ice-shaving machine of this invention.

FIG. 5 shows a perspective view of an alternative ice shaving machine 500 of this invention. This embodiment of the invention, has an easy to clean plastic cabinet 501. Atop the cabinet 501 is a large ice hopper 502, which has a clear "lexan" cover 508. Within the hopper 502 is an opening 510 leading to the scraper 509 which forces the ice into contact with a blade, shown in FIG. 6. The flaked ice is provided via a, preferably clear "lexan" plastic spout 503 to a container (not shown). The preferred spout 503 not only catches the shaved ice ("snow") in the cup, but is also shaped to form the top of the cup to give it a domed round top, as is common on typical snow cones. The spout 503 is attached to a vinyl flap 512 that is adapted to wrap under the cup to assist the user in fitting snow in the cup and to help keep the user's hands dry and out of the produced snow. The cabinet 501 has a drip pan 507, which has a drain 511, which has a drain hose 506 attached. This embodiment of the invention 500 can be activated either by a toggle switch 504 or a foot pedal 505, either of which is connected to a direct drive motor for driving the scraper 509. In the current best mode embodiment of this invention, the hopper 502 holds up to eight pounds of ice. The cabinet 501 is 14 inches wide, 24 inches tall and 21 inches deep. The scraper 509 is rotated at up to 500 rpm, thereby filling a 42 oz cup in seconds.

Figure 6:
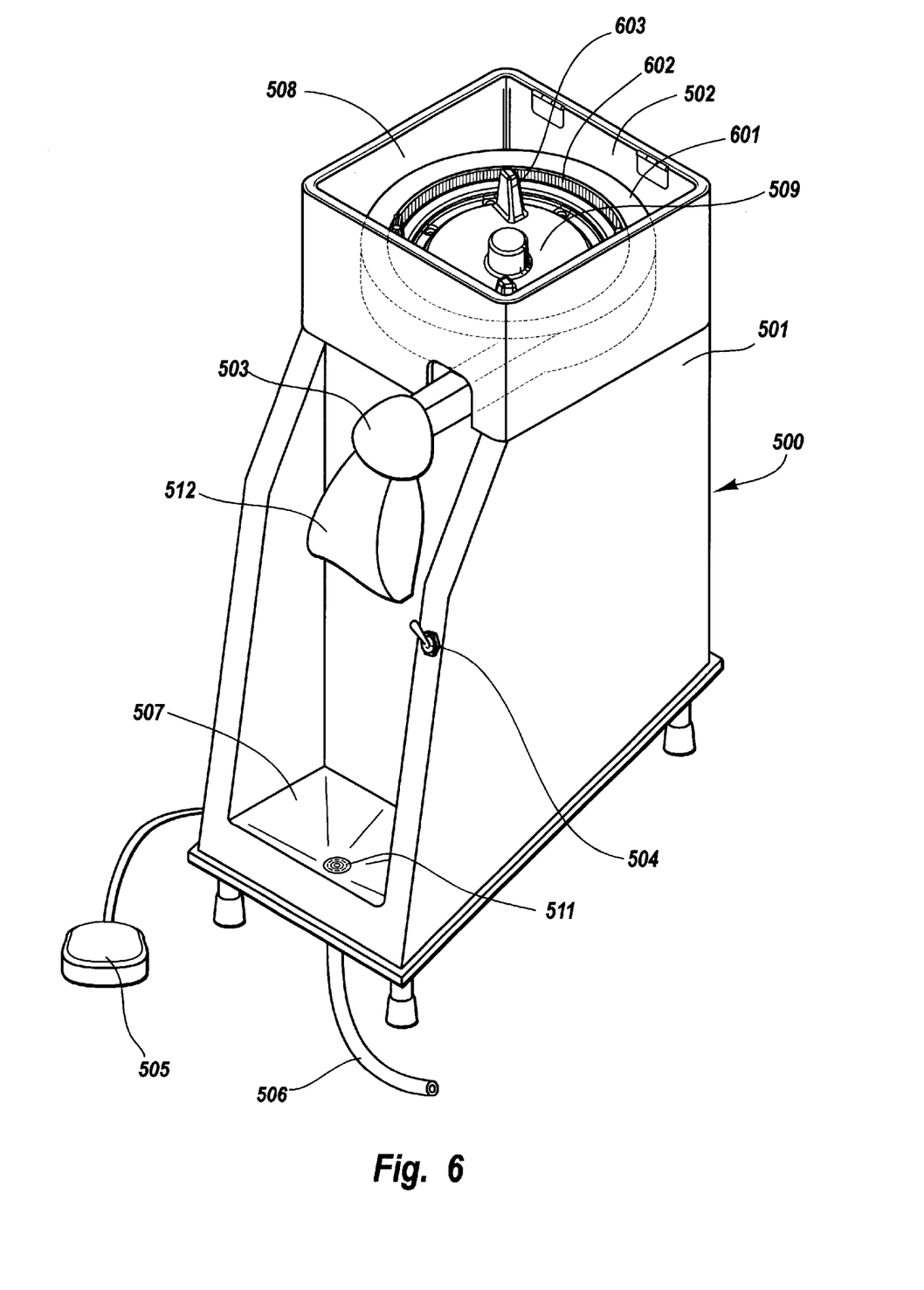
FIG. 6 depicts a perspective view of the alternative ice shaving machine of this invention with the ice hopper removed to view the preferred blade, scraper and spout assembly.

FIG. 6 shows a perspective view of the alternative ice shaving machine of this invention with the hopper removed to show the preferred blade 602, scraper 509 and spout 601 assembly. This view shows the paddles 603 which rotate with the scraper 509 to bring the ice in contact with the blade 602, which is shown with slots as previously described in the preferred embodiment. The scraper 509 preferably has two different scraper elements. The first scraper element brings the ice into contact with the blade 602 for shaving. While the second scraper element outputs the shaved ice out of the spout 503.

Figure 7:
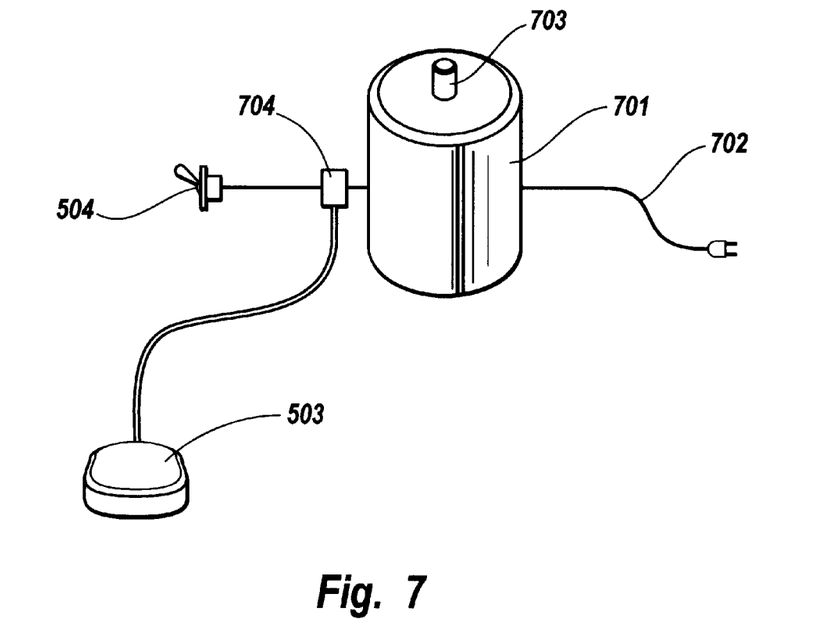
FIG. 7 depicts the preferred internal components of the alternative ice-shaving machine of this invention.

FIG. 7 shows the preferred internal components of the alternative ice shaving machine of this invention. The motor 701 is shown with a drive shaft 703, which fits to the scraper 509. The preferred motor 701 is a ¾ horsepower direct drive AC motor, which receives AC power from a standard AC plug 702. A parallel connection 704 is provided which is electrically connected to the toggle switch 504 and the foot pedal 503 for turning-on and off the motor 701.

Figure 8:
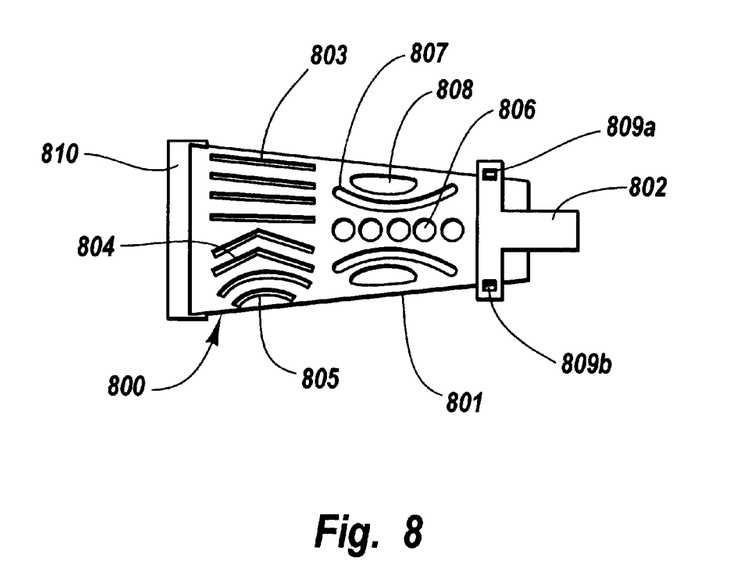
FIG. 8 depicts an alternative blade design, which can be substituted for the blade shown in the previous drawings.

FIG. 8 shows a representative alternative blade design 800, which can be substituted into either the preferred, or the alternative embodiment of the invention. This blade design 800 is provided with a drive shaft fixture 802 for receiving the motor drive shaft. In the use of this blade embodiment, it is the blade, which is turned instead of the scraper, while the scraper is held in place to remove the ice flakes from the outside 501 of the blade. This blade 800 is preferably made of stainless steel and is of a generally conical shape, with the ice received into the interior of the cone and flakes scraped away from the exterior of the blade 801. This blade 800 is provided with a plurality of cutting edges, which may include a selection of cutting shapes, including straight edges 803, bent chevron edges 804, curved edges 805, circular cutting edges 806, curved slots 807 and oval shaped slots 808. A particular blade of this invention may include some, all or alternative equivalent shapes cut and bent in the blade surface 801 and still be within the intended scope of this invention.

Figure 9:
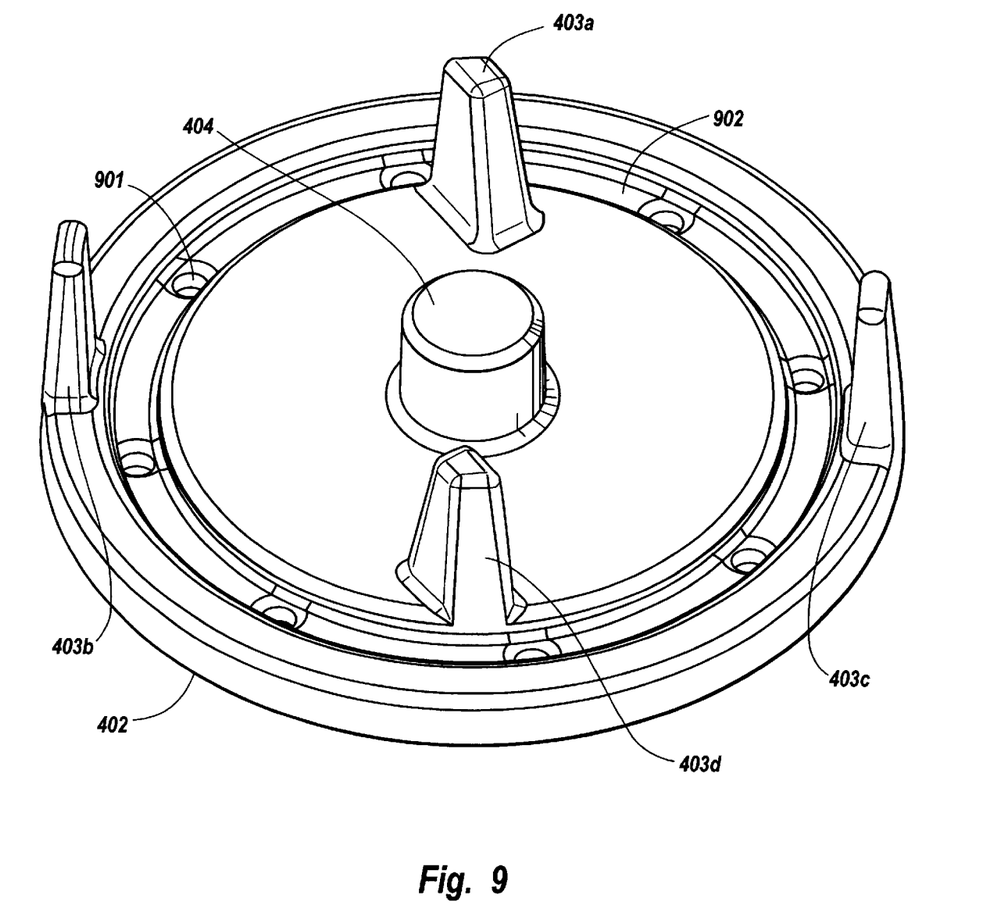
FIG. 9 depicts a detailed view of the preferred scraper wheel of this invention.

FIG. 9 depicts a detailed view of the preferred scraper wheel of this invention. This view provides additional detail, showing the scraper 402 having paddles 403a–d. Paddles 403a and 403d are positioned to drag the ice over the blade. Paddles 403b and 403c are adapted to discharge the shaved ice out of the spout 503. A groove 902 is provided for the blade and which also makes a seal to keep the ice in place until it is shaved. Valve drain holes 901 are provided as an outlet of resulting water.

It is to be understood that the above-described embodiments are merely illustrative of numerous and varied other embodiments, which may constitute applications of the principles of this invention. Such other embodiments may be readily devised by those skilled in the art without departing from the spirit or scope of this invention and it is the inventor's intent that these alternative embodiments be deemed as within the scope of this invention.

I claim:

1. A blade and a spout system for an ice shaving and dispensing machine, comprising:

(A) an inner surface for receiving ice;

(B) an outer surface;

(C) a scraper having a paddle and a shaft head for receiving a drive shaft, wherein said scraper brings the received ice in contact with said inner surface of said blade;

(D) a cutting slot, punched into and through said outer surface to said inner surface, to provide a cutting edge on said interior surface of said blade, and wherein said cutting slot further comprises an upwardly bent edge which is adapted to come into contact with the received ice; and (E) a spout for receiving shaved ice from said cutting slot of said blade, wherein said spout is shaped to form a domed rounded top on the dispensed shaved ice.

2. A blade and a spout system for an ice shaving and dispensing machine, as recited in claim 1, wherein said blade is composed of stainless steel.

3. A blade and a spout system for an ice shaving and dispensing machine, as recited in claim 1, wherein said cutting slot is selected from the group consisting of: straight slots, bent chevron edges, curved edges, circular cutting edges, curved slots, and oval slots.

4. A blade and a spout system for an ice shaving and dispensing machine, as recited in claim 1, further comprising a plurality of cutting slots.

5. A blade and spout system for an ice shaving and dispensing machine, as recited in claim 1, further comprising a flap attached to said spout adapted to wrap about a cup.

* * * * *